United States Patent Office 3,218,923
Patented Nov. 23, 1965

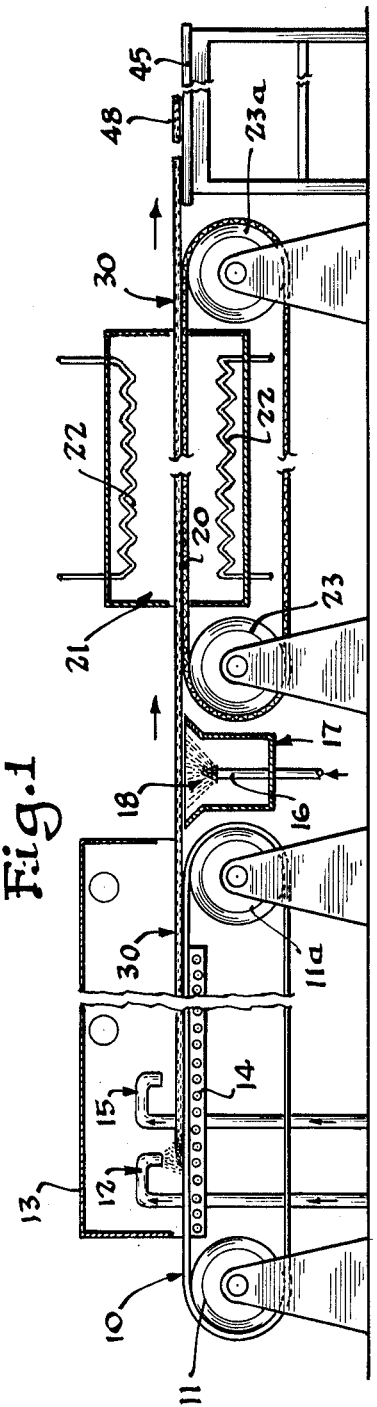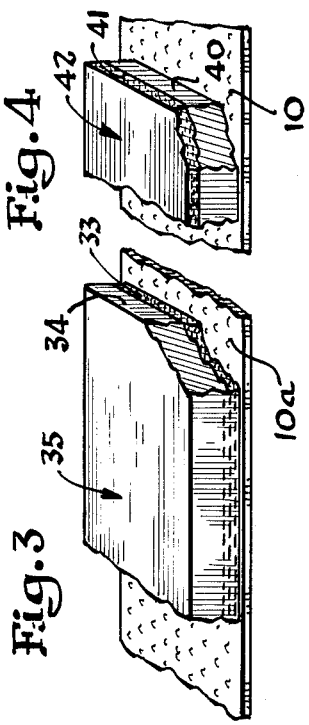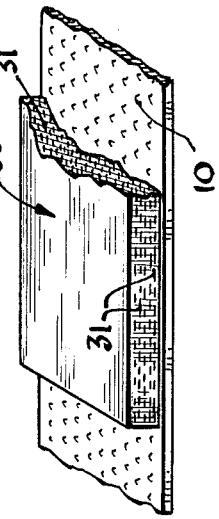

3,218,923
FLEXIBLE REFLECTIVE SCREEN
Ovid Paul Ciofani, 2114-18 W. Grand Ave., Chicago, Ill.
Filed July 24, 1961, Ser. No. 126,326
3 Claims. (Cl. 88—28.9)

The present invention relates generally to sheet material having a reflective surface and more particularly to a highly reflective screen used in connection with motion picture and slide projectors and to a method of producing said screens.

Heretofore, reflective screens for use with motion picture and slide projectors have been made by applying a coating of reflective metal powder to the surface of a flexible strip, such as a sheet of rubber, Celluloid, or other plastic such as polyvinyl plastic, and a backing member of fabric or other flexible material being added, if desired. More recently efforts have been made to position the particles of metal powder on the surface of the sheet material to increase the reflectance of the screens.

These prior art screens, however, have not been entirely satisfactory because, for example, they are unsuitable for packaging in a very small container over a long period without impairing the reflective qualities of the screen or they assume a permanent set or are otherwise generally unable to return to their original planar form when unpackaged. Many of these screens also develop cracks in the reflective surface or body thereof due to aging of the surface material or the backing material which is often secured thereto to provide additional support or strength. Also, the method of producing these screens often involves special handling and procedural steps which add materially to the production costs thereof.

It is therefore an object of the invention to provide an improved highly reflective flexible sheet material which can be repeatedly folded or rolled into a small package without permanently impairing the reflective properties thereof and which is suitable for use as a cinematographic screen with all types of picture projector apparatus.

It is a further object of the present invention to provide a highly reflective flexible screen the surface of which is resistant to cracking and which when soiled can be readily cleaned without impairing the reflective properties of the screen.

Still another object of the present invention is to provide a highly reflective flexible screen which has reflective particles throughout substantially the entire thickness of said screen oriented in a plane substantially parallel with the surface of the screen.

Another important object of the present invention is to provide an improved and more economical method of making a flexible highly reflective screen which is particularly adapted for cinematography.

Other objectives of the present invention will be apparent to those skilled in the art of the following detailed description and claims to follow when read in conjunction with the accompanying drawings herein.

FIGURE 1 is a diagrammatic side view of the procedural steps and apparatus used for producing a flexible reflective screen in accordance with the present invention.

FIGURE 2 is an enlarged perspective view partially in vertical section of a flexible screen produced on the apparatus of FIGURE 1.

FIGURE 3 is an enlarged perspective view partially in vertical section of a modified form of a flexible screen produced on the apparatus of FIGURE 1.

FIGURE 4 is an enlarged perspective view partially in vertical section of a further modified form of a flexible screen of the present invention.

It has been discovered that the foregoing objectives of the present invention are achieved by forming a flexible sheet or strip with a highly reflective surface with an aqueous emulsion or dispersion of plastomeric material, such as natural latex, having uniformly distributed therethrough a highly reflective particulate material, such as metal powder or flakes.

It has been found that when a finely divided material, such as aluminum flakes, is dispersed in an aqueous emulsion, such as latex, the flakes are oriented in a substantially horizontal plane throughout the entire strip when the emulsion is formed into a sheet or strip, as by spraying on a platen or other supporting surface. Thus, when the aqueous emulsion or dispersion of an elastomeric material containing aluminum flakes or powder is formed into a wet film and solidified in a controlled manner, it is found that the particles of reflective material are oriented throughout the entire body as well as over the entire surface of the sheet with the longitudinal axis of each aluminum flake lying in a plane substantially parallel with the surface of the sheet. And, as a result of the orientation of the particles throughout the body of the sheet material in the foregoing manner, substantially improved properties are obtained which are not present in any of the prior art's reflective sheets or screens. For example, with the oriented reflective particles extending throughout the body of the screen, there is no significant reduction or loss of reflectants over the life of the reflective screens due to dislodgment of particles of the reflectant material from the surface of the screen, and it becomes possible to clean the screen by means which would otherwise be impossible. Thus, for example, it is possible to clean and dry the screen of the present invention in an ordinary mechanical washing machine and dry it without harming the screen in any way or impairing its original reflectance.

A number of aqueous plastomeric emulsions or dispersions which are suitable for "floating" or otherwise orienting the reflective particles can be employed in the present invention. The preferred plastomeric material, however, is a pure gum prevulcanized, clear, natural latex dispersion having a finely particulated reflective material uniformly distributed throughout the latex dispersion. By employing a prevulcanized latex dispersion a minimum of heating is required to form a permanent stabilized flexible film or strip and, by using a clear latex dispersion, more of the particles of light reflective material present in the screen and on the surface thereof are capable of effectively reflecting light. Thus, for example, these particles of reflective material encased in a thin film of the clear latex are still capable of reflecting light as are those particles which are not necessarily at the surface of the screen. The resultant effect is that the screen made in accordance with the process of the present invention and which uses a clear latex dispersion as the vehicle for the reflective particles exhibits increased reflectance.

It is also posisble to use a natural latex or syntehtic latex which is not prevulcanized but which contains the necessary accelerators and curing ingredients. When aqueous emulsions or dispersions of the latter type are used in place of the prevulcanized latex a definite curing treatment must be employed after the film or sheet has dried. The resulting product in the form of a cured sheet or strip is comparable to that in which a prevulcanized latex is employed.

Other plastomeric or elastomeric emulsions or dispersions of the foregoing type can be used in the present invention. For example, the plastomeric material used to form the dispersion or aqueous emulsion can be synthetic rubber such as butyl rubber.

The particlulated reflective material employed in the present invention can be a finely divided metal such as aluminum, magnesium and bronze in the form of a powder or flakes. The preferred reflective material is aluminum powder or flakes of the standard commercial type having the surface treated with an antiblocking agent to prevent caking of the particles during storage. It is also within the scope of the present invention to use highly reflective oxides such as titanium oxide and synthetic flakes and powders such as phosphorescent pigments, and plastics including pearlescent materials. The flakes or powders are of a generally elongated form and have a particulate size range between 90 mesh and 500 mesh (U.S. standard).

It has been found that the particulated reflective material can be used in the hereindescribed aqueous dispersion or emulsion of plastomeric material over a wide range of concentrations. While a concentration between 5 and 10 percent by weight is preferred, good results can be obtained by employing the reflective material in an amount between about 2% and 25% by weight of the emulsion. The concentration of reflective material employed will depend on the particular use intended and the type of reflective material selected.

A very efficient and economical process has been devised to form a reflective flexible sheet or strip in accordance with the present invention whereby the aqueous dispersion of plastomeric material containing the particulate reflective material is sprayed into a heated platen to provide a wet film or layer generally having a thickness when dry between about 0.002 inch and 0.250 inch with the thickness of the film depending upon the particular use and the economic limitations imposed. The platen must be substantially non-adherent to and non-reactive with the plastomeric material and can be either stationary or moving during the spraying of the aqueous dispersion. If desired, the platen can be treated with an anti-blocking agent, such as a liquid silicone or silicone grease, to reduce the adherence of the film to the platen.

An important aspect of the present process for providing a highly reflective screen is in allowing the aqueous dispersion of plastomeric material containing the light reflective particles to remain on the platen as a wet film for a sufficient period of time to permit the reflective particles "floating" or otherwise orienting in a substantially horizontal plane parallel to the surface of the screen. If the wet film of latex dispersion or other plastomeric material is dried too rapidly and "sets up" before the particles are properly oriented, the surface of the film is rough and does not have as high a light reflectability as when the particles are allowed to orient properly. The temperature required will of course vary with the composition of the dispersion and the thickness of the film formed.

The rate of drying of a particular wet film is largely determined by the temperature of the surface onto which the aqueous dispersion is sprayed and to a certain degree on the temperature of the atmosphere thereabout. When the plastomeric dispersion is sprayed on the platen, it has been found that the temperature of the platen can range between about 90° and 220° F. and the period of time which the wet film of plastomeric material is maintained in contact with the heated platen must be sufficient to dry the wet film and thereby allowing the film to set to a non-tacky consistency. The heating period required to dry the wet film will also depend on the temperature of the platen and the particular composition of the aqueous dispersion employed. When employing a natural latex dispersion containing aluminum powder or flakes, for example, the sheets should be held for a period of about 2 to 3 hours with the platen at a temperature of about 90° F. With the platen at a temperature of about 220° F. the heating period required to dry the wet film is about 20 minutes. In general, it is preferred to maintain the platen at a temperature of about 150° F. to 180° F.

When the sheet has become substantially dry and sufficiently non-tacky to permit handling, the sheet is, in the preferred embodiment, removed from the platen and dusted with an anti-blocking agent, such as talc, zinc, stearate, or the like. The sheet is then, in the preferred embodiment, placed on a supporting screen or other perforated supporting means which may be either moving or stationary and held in a heated curing zone or chamber wherein a temperature of between about 90° F. and 220° F. is maintained for a period between about 3 hours at the lower temperatures and 20 minutes at the upper temperature, until the sheet is fully cured. When fully cured, the sheet is removed from the supporting screen, trimmed to the desired size and packaged or stored until used. If desired, however, the screen can be allowed to remain on the platen after the wet film of plastomeric dispersion is substantially dry until the plastomeric material is fully cured. When the latter procedure is followed the length of platen can be adjusted and the temperature of the platen at various points along the length thereof can be adjusted as required so that effective drying and proper curing is accomplished without damaging the plastomeric material by excessive heat.

When it is found unnecessary or undesirable from an economical standpoint to form the sheet entirely of a dispersion of plastomeric material containing reflective particulates distributed throughout the entire body of the sheet, it is possible to form a unitary sheet or strip of reflective material having one portion comprising one lateral surface of the screen of plastomeric material without reflective particles therein, or if desired, containing a particular coloring agent and having another portion comprising the other lateral surface of the screen of plastomeric material with oriented reflective particles distributed uniformly therethrough. The latter unitary structure is readily formed by spraying of forming a first wet film of plastomeric dispersion on a heated platen and, before the wet film of plastomeric material is dry, spraying or otherwise forming thereover a second wet film of plastomeric dispersion which contains reflective particles uniformly distributed therethrough. The respective wet films merge at their interface to form an integral structure. When the sheet thus formed is fully cured it is impossible to separate its respective inner and outer portions. The respective inner and outer portions can have any desired or required thickness.

In the preferred embodiment of the present invention the dispersion of plastomeric material is sprayed under pressure through one or more spray nozzles, preferably reciprocable spray nozzles, onto a moving endless platen formed of heat resistant material inert to the dispersion, such as stainless steel or heat resisting plastic material, such as tetrafluoroethylene (Teflon) or other inert materials having little tendency to adhere to the plastomeric dispersion sprayed thereon. For efficient operation the platen should be heated at the time the elastomeric dispersion is sprayed thereon and any suitable means of applying heat thereto can be employed. For example, the platen can be heated by conduction on passing over a heated bed or conduit or by convection on passing through a heated chamber. If desired, the platen can also be embossed with a suitable pattern which will provide the sheet or strip with a desired lenticular or other pattern on the surface thereof. A coating of silicone or similar material is preferably applied to the embossed surface to facilitate removal of the screen from the platen.

A special feature of the present invention is the formation of a flexible reflective sheet or strip consisting of natural latex which contains aluminum powder or flakes as the reflective material. Since a rapid chemical reaction takes place when aluminum powder contacts latex, it has heretofore not been considered practical to employ latex as the vehicle for suspending aluminum flakes or the like metallic material therein. It has now been found, however, that by spraying a freshly prepared latex dispersion containing aluminum powder onto a platen which is heated, the chemical reaction which normally takes place is immediately arrested and thereafter does not proceed to any detectable extent. The importance of applying the latex dispersion to a moderately heated platen will therefore be clearly evident.

In order to reduce to a minimum the chemical reaction between aluminum powder and the latex dispersion, one can use a mixing spray apparatus both for mixing the aqueous latex dispersion with the aluminum powder and for applying the mixture to the platen. Thus the aluminum powder suspended in the distilled water which can contain a wetting agent is supplied to a mixing gun through one line and the liquid latex is supplied to the mixing gun through a separate line.

In preparing a natural latex-aluminum powder dispersion suitable for spraying in the instant process, clear liquid latex which contains about 60% solids as purchased is mixed with up to about 50% by weight water and the aluminum powder is slowly added with constant agitation. The water is added primarily as an aid in dispersing the aluminum powder throughout the latex. The latex-aluminum powder dispersion should be used soon after preparation and within about two hours so that the chemical reaction therebetween does not proceed to a detrimental extent. Also, a wetting agent can be added to the mixture to facilitate dispersing the aluminum powder through the latex mixture.

The following examples are set forth to further illustrate the process of producing a reflective flexible sheet or screen in accordance with the present invention:

*Example I*

An aqueous dispersion of an elastomeric material suitable for spray application is prepared by adding to a pure gum, prevulcanized, natural latex dispersion containing 60% solids (said dispersion being manufactured by General Latex & Chemical Corporation, Boston, Massachusetts), pure distilled water and aluminum powder having a particle size of 120 mesh (Aluminum Powder No. 242, manufactured by Crescent Bronze Powder Co., Chicago, Illinois) in the proportions of 20 fluid ounces of the liquid latex, 7 fluid ounces of distilled water and 6 ounces by weight of the aluminum powder. The aluminum powder is added gradually with constant stirring to the latex dispersion containing the added distilled water until a homogeneous mixture is produced.

The aqueous dispersion prepared in the above manner is sprayed on to an endless embossed steel platen 10 which is disposed in a substantially horizontal plane and which extends between driving rollers 11, 11a, spaced about 60 feet. The said dispersion is discharged through one or more reciprocating spray nozzles 12 spaced about 15 feet inwardly from the roller 11 and elevated about 18 inches above the surface of the platen 10. An exhaust hood 13 encloses the spray apparatus and a portion of the platen 10. The spray nozzles 12 and provided with a Binks spray head No. 63PB. The spray nozzles 12 are capable of operating under air pressure between about 15 and 100 pounds per square inch, depending upon the line speed of the platen 10 and on the composition of the latex dispersion and the thickness of the elastomeric sheet to be formed. The film or sheet 30 formed by spraying the above composition consisting of the latex-aluminum powder at a pressure of about 80 pounds per square inch has a thickness of about 0.010 inch (drying basis) and weighs about 16 ounces per 44 inch square section. The platen 10 before the dispersion is sprayed thereon is heated to a temperature of about 150° F. and is maintained at the latter temperature by passing over a heated bed 14 through which a heated fluid is circulated. The linear speed of the platen 10 is adjusted to a rate of about one foot per minute so that the sheet 30 of the latex-aluminum powder remains on the heated platen 10 for about 45 minutes before reaching the roller 11a.

When the sheet 30 reaches the roller 11a the sheet 30 is separated from the platen 10 and an anti-blocking agent, such as talc 18, is applied by means of a nozzle 16 at a dusting station 17. The sheet 30 is then placed on an endless supporting screen 20 moving at a constant speed of about one foot per minute through a heated curing chamber 21 maintained at a temperature of about 180° F. by heating coils 22. The screen 20 is supported by driving roller 23, 23a which are spaced about 60 feet.

When the sheet 30 reaches the roller 23a the sheet is fully cured without vulcanization and is trimmed on a trimming table 45 to the desired screen size and thereafter each individual screen 48 can be packaged or stored as desired.

The embossed screen 48 thus produced has a thickness of about 0.010 inch and has the aluminum powder in the form of flakes 31 oriented throughout the entire body of the sheet in a plane substantially parallel with the lateral surface thereof. The screen 48 can be packaged by folding into a small container, can be washed and dried in an ordinary mechanical washing machine and dryer, and can be suspended on a flat surface or mounting on a suitable frame under tension when used as a cinematography screen for showing motion pictures, slides or stereoscopic projections.

*Example II*

An aqueous dispersion of aluminum flakes in liquid latex suitable for spray application is prepared as in Example I and supplied to spray nozzle 12. A second dispersion containing pure gum, prevulcanized, natural latex dispersion having 60% solids is supplied to a second recirocating spray nozzle 15 of the same type as nozzles 12, spaced about five feet longitudinally from nozzle 12 and about an equal distance above the platen 10a. The aqueous dispersion of aluminum in latex is first sprayed onto a heated endless steel platen 10a through nozzle 12 to provide a wet film 33 containing oriented aluminum flakes througout a matrix of latex. The latex film thus formed has a thickness of about 0.003 inch when dry. The pure latex dispersion is then applied to the uncured surface of the wet film of aluminum-latex by spray nozzle 15. The pure latex is applied to form a wet film 34 having a thickness of about 0.006 inch when dry. The wet films merge into a single unitary sheet and the composite sheet is processed as in Example I to form a unitary cured sheet 35. The resultant sheet 35 has a finished thickness of about 0.009 inch, weighs about 15 ounces per 44 inches square section and has substantially the same properties as the sheet of Example I.

*Example III*

An aqueous dispersion of liquid latex containing aluminum flakes and clear liquid latex suitable for spray application are prepared as in Examples I and II. The clear liquid latex is supplied to spray nozzle 12 and a wet film 40 of clear latex is sprayed onto the platen 10 in an amount sufficient to form about two-thirds the thickness of the desired screen. Before the wet film 40 is dry, the dispersion of liquid latex containing aluminum flakes is sprayed onto the wet film 40 to form a second wet film 41 in which the aluminum particles are oriented substantially parallel with the surface of the platen and comprising about half the thickness of the film 41. The wet films 40 and 41 merge to form a unitary sheet 42 which is dried and cured as in Examples I and II. The finished screen has a thickness of about 0.12 inch and possesses very high reflectance and pronounced resistance to creasing.

*Example IV*

An aqueous dispersion of natural gum latex containing titanium dioxide suitable for spray application is prepared in accordance with the procedure described in Example I by substituting for the aluminum powder a quantity of finely powdered titanium dioxide in an amount comprising 20% by weight of the 60% latex dispersion. The latex-titanium dioxide dispersion is applied to a heated moving platen as in Example I. The resultant flexible reflective screen is about .024 inch thick and has the ability of being packaged in a relatively small space and of being mechanically cleaned without impairing its reflective properties.

While the preferred liquid latex dispersions have been employed in the foregoing specific examples, other emulsions or dispersion of a type similar to the natural latex dispersion used herein can be used in place of the latex. For example, the elastomeric component of the aqueous dispersion can consist of a synthetic rubber, such as chloroprene.

Others may practice the invention in any of the numerous ways which are suggested to one skilled in the art of this disclosure, and all such practice of invention are considered to be a part hereof which fall within the scope of the appended claims.

I claim:

1. A unitary resilient light reflective flexible screen consisting of a unitary flexible sheet of solidified clear latex having a laterally extending first unitary portion including one lateral surface of said sheet which forms a substantial proportion of the thickness of said sheet and having uniformly distributed therethrough between about 2% and 25% by weight light reflective metal particles and a laterally extending second unitary portion integrally formed with said laterally extending first unitary portion, said second unitary portion being free of said particles of light reflective material, and said unitary flexible latex sheet adapted to be substantially stretched by placing under tension without impairing the light reflective properties of said first unitary portion of said sheet.

2. A unitary resilient light reflective flexible screen as in claim 1, wherein the said laterally extending first unitary portion containing light reflective metal particles comprises about one-third the thickness of said sheet.

3. A unitary resilient light reflective flexible screen as in claim 1, wherein said light reflective metal particles are aluminum flakes having a particle size of about 120 mesh and comprising about 10% by weight of said first unitary portion of said sheet.

References Cited by the Examiner
UNITED STATES PATENTS

| | | | |
|---|---|---|---|
| 1,216,154 | 2/1917 | Meadway | 88—28.9 |
| 1,258,192 | 3/1918 | Coleman | 88—28.9 |
| 1,672,631 | 6/1928 | Troeger | 88—28.93 |
| 2,032,935 | 3/1936 | Hurt | 18—58 |
| 2,875,087 | 2/1959 | Crandon | 88—28.9 X |

FOREIGN PATENTS 936,764  2/1948  France.

JULIA E. COINER, *Primary Examiner.*

EMIL G. ANDERSON, *Examiner.*